June 14, 1960   D. C. MUNRO   2,940,215
NOISE MAKING DEVICE FOR VELOCIPEDES OR THE LIKE
Filed Dec. 7, 1956   2 Sheets-Sheet 1
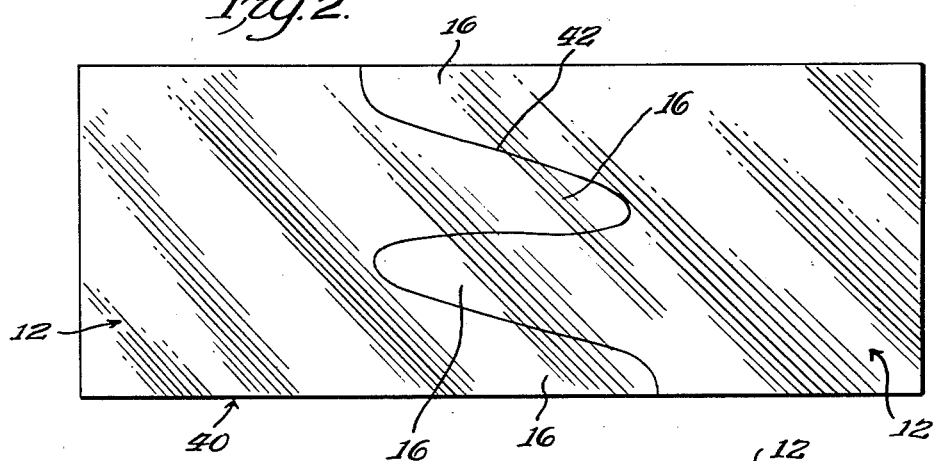
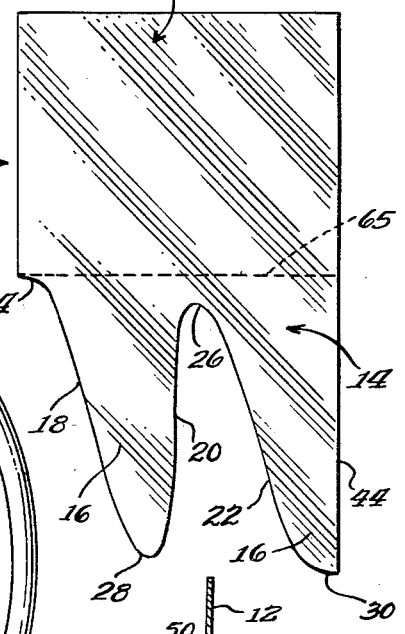
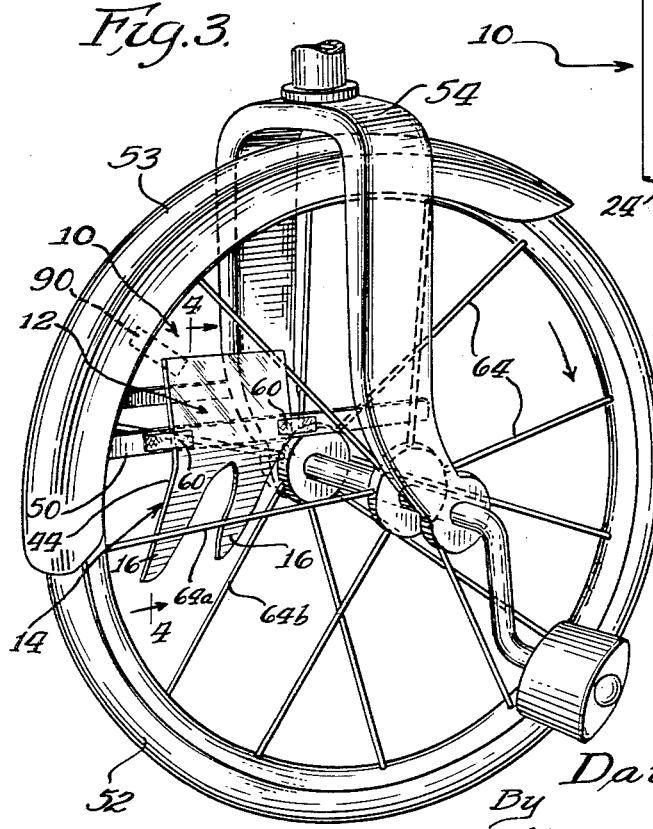
Inventor
David C. Munro.
By Mann, Brown & McWilliams
Attys.

June 14, 1960 D. C. MUNRO 2,940,215
NOISE MAKING DEVICE FOR VELOCIPEDES OR THE LIKE
Filed Dec. 7, 1956 2 Sheets-Sheet 2
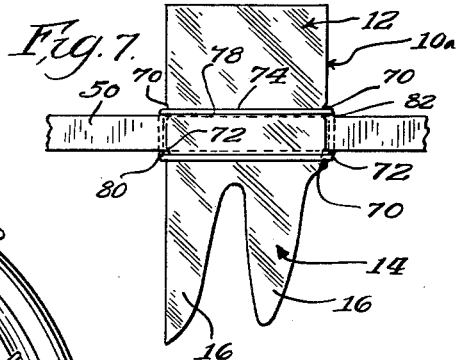
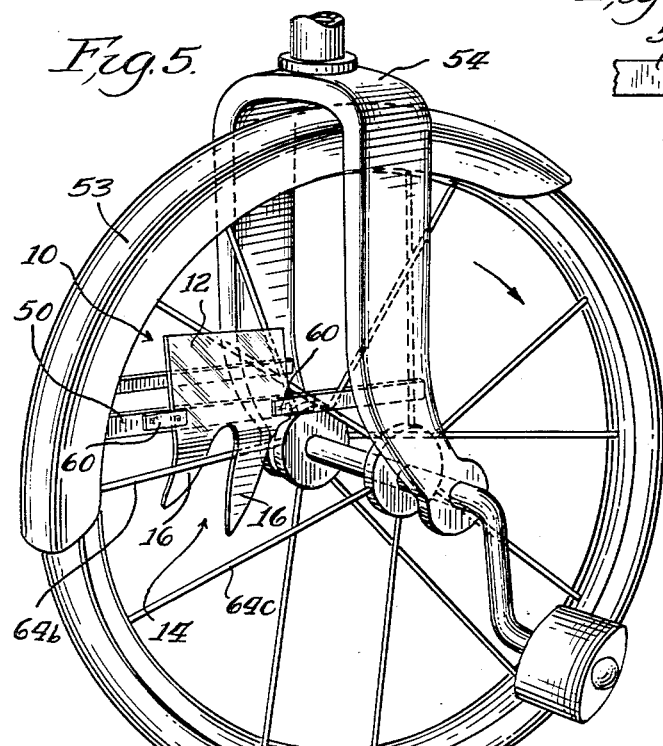
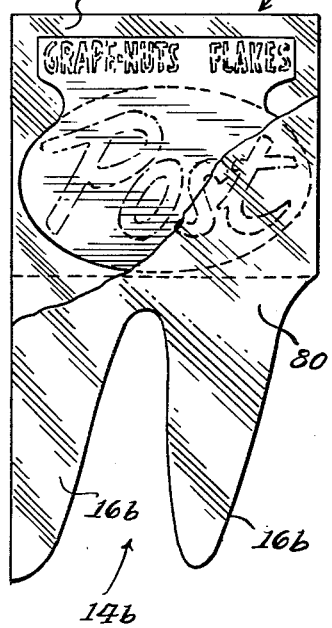
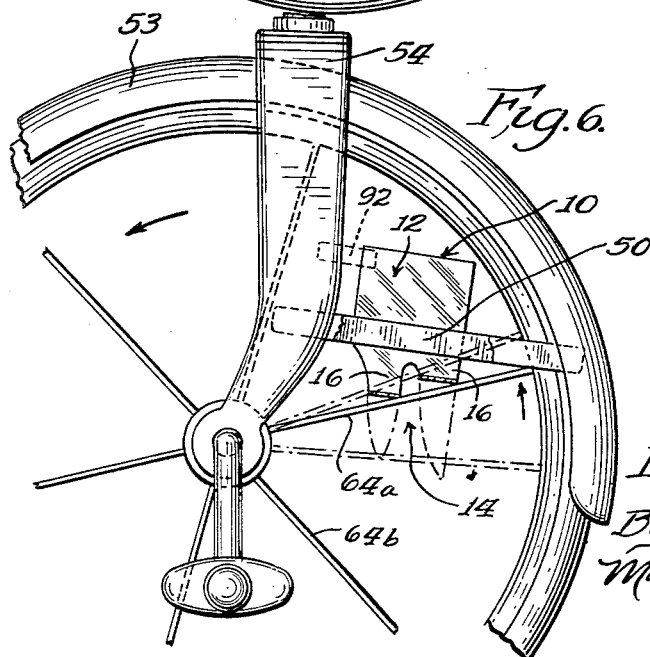
Inventor
David C. Munro
By
Mann, Brown & McWilliams
Attys.

United States Patent Office 2,940,215
Patented June 14, 1960

2,940,215

NOISE MAKING DEVICE FOR VELOCIPEDES OR THE LIKE

David C. Munro, 2115 E. 97th St., Chicago 17, Ill.

Filed Dec. 7, 1956, Ser. No. 627,068

3 Claims. (Cl. 46—175)

My invention relates to a noise making device for velocipedes or the like, such as bicycles, tricycles, and so forth.

Most noise making devices of this type include a strip of resilient plastic or the like that projects into the path of movement of the wheel spokes. As the wheel turns, the individual spokes engage the plastic strip and bend it, and as the individual spokes slip by the strip, the strip slaps up against the next succeeding spoke. Youngsters are very much attracted to these devices, but due to the fact that they include, in addition to the resilient strip, at least several separate moving or movable parts, and require a secure mounting on the bicycle or tricycle frame, they are relatively expensive and therefore have only limited market possibilities.

The principal object of my invention is to provide a one-piece noise making device for velocipedes or the like which is of the utmost simplicity of design and yet which is sufficiently rugged to withstand the action of the wheel spokes on it for a substantial period of time.

A further object of the invention is to provide a noise making device for bicycles and tricycles or the like which is designed to enable youngsters to readily attach it to the velocipede frame with minimum instruction.

Another object of the invention is to provide a one-piece noise making device for bicycles or tricycles or the like of extremely simplified design, which enables it to be manufactured at unusually low cost of material and manufacturing expense.

Still another object of the invention is to provide a simplified and economical method of making my device.

Yet another object of the invention is to provide a noise making device that is especially designed to withstand the wearing action of the spokes on it.

Still a further object of my invention is to provide a velocipede noise making device that provides a new and unusually attractive type of repeating sound.

Yet a further object of my invention is to provide a noise making device for velocipedes that requires only adhesive tape or a rubber band, or the like, to fix it securely in place.

Further objects, uses, and advantages will become apparent or be obvious upon a reading of the accompanying description and a consideration of the accompanying drawings.

In the drawings:

Figure 1 is a plan view of a preferred embodiment of my invention;

Figure 2 is a plan view illustrating the preferred method of forming the device shown in Figure 1;

Figure 3 is a perspective view of the front wheel of a bicycle or tricycle showing the form of the invention of Figure 1 applied thereto;

Figure 4 is a diagrammatic, fragmental cross-sectional view along line 4—4 of Figure 3, illustrating the cooperation between one of the device flaps and adjacent spokes of the velocipede wheel;

Figure 5 is a view similar to that of Figure 3 illustrating a different position of the wheel spokes with respect to the noise making device comprising my invention;

Figure 6 is a rear elevational view of the device as shown in Figure 3, showing the unstressed position of the spoke striking portions or flaps thereof in broken lines and showing the spoke engaging position of the spoke engaging flaps in section;

Figure 7 is a plan view of another form of my invention attached to a velocipede fender brace in a modified manner; and Figure 8 is a plan view of another modified form of the invention, parts being broken away for clarity of illustration.

Reference numeral 10 of Figures 1 and 3 generally indicates the preferred embodiment of the invention. The noise making device 10 is a one-piece element that includes a sounding board portion 12 and a flap portion 14. In the illustrated embodiment, the sounding board portion 12 is generally quadrilateral in configuration and the flap portion 14 comprises a plurality of flaps, projections, or tongues 16 integrally united with the sounding board portion 12. The flaps or tongues 16 are preferably defined by rounded curves 18, 20, and 22, which form rounded corners 24 and 26 where the flaps or tongues 16 join the sounding board portion 12 and form rounded tips 28 and 30 at the ends of these flaps or tongues.

Preferably the flaps or tongues 16 have a relatively long tapered configuration illustrated for a purpose hereinafter made clear, and I have found that a taper of approximately 0.3 inch per inch of length is best suited for the purposes of my invention.

The device 10 is preferably formed from polystyrene, a transparent substance, made by, for instance, Arvey Corporation of Chicago, Illinois. The material from which the device 10 is formed comes in sheet form and is made by an extrusion process in which the material is biaxially stretched as it is extruded. It is a relatively stiff and tough material, and I have found that it is best adapted for the purposes of my invention. It will take on a permanent bend when bent rather forcefully at a sharp angle.

The device 10 is preferably formed in the manner indicated in Figure 2, wherein reference numeral 40 generally indicates a single sheet of polystyrene having a generally quadrilateral configuration, which is cut along the line 42 that defines the flaps 16. The cutting may be done by a suitably formed die in a conventional cutting machine for cutting sheet material of this type. It will be noted that this method forms two identical devices 10 without any waste whatsoever.

Preferably, in the illustrated embodiment of the invention, the curved lines 18, 20, and 22 (see Figure 1) define two flaps in such a way that the flap with the straight side 44 is somewhat longer than the other flap.

In use, the device 10 is attached to the fender brace 50 of a conventional bicycle or tricycle wheel 52. As is well known in the art, the fender brace 50 may be secured between the conventional fender 53 and one arm of wheel fork 54 of the velocipede. The device 10 may be secured to the fender brace 50 in any suitable manner, but preferably is secured by applying strips of adhesive tape 60 (see Figure 3) to the device and the fender brace 50. As indicated in Figure 3, the device 10 is positioned with respect to the fender brace so that the sounding board portion 12 is on one side thereof and the flaps 16 are on the other side thereof, the latter side preferably the upstream side with respect to the normal direction of movement of the spokes. After the device 10 is secured to the fender brace 50, the flaps 16 should be bent inwardly somewhat into the plane of the wheel spokes 64. This can be done by bending the flaps sharply toward the spokes, which will give the flaps a set. A dotted line 65 or the like may be imprinted or formed where indicated in Figure 1 to indicate the desired bend line for the device.

When the youngster rides his bicycle or tricycle, the wheel 52 turns in the direction of the arrows of Figures 3, 5, and 6 which brings the spokes 64 on each side of the wheel towards the flaps 16 of the device 10. In the illustrated embodiment, the flap 16 with the straight side 44 is made long enough so that it will be engaged by the spokes on both sides of the wheel, while the other flap 16 is made short enough so that the spokes on the far side of the wheel as viewed in Figure 3 will not engage it.

As the spokes move into engagement with the respective flaps, they are moved upwardly until they slip by the spokes and return to their original position, slapping against the succeeding spoke in so doing. In the case of the shorter flap 16, it engages only every other spoke, that is, the spokes on the side of the wheel facing the observer in Figures 3 and 5, so it does not slap against any spoke but snaps back to its unstressed position, thus making a different noise and providing a different action than the other flap, and adding to the appeal of the device in the eyes of youngsters.

The progressive steps of movement of the flaps are shown consecutively in Figures 3, 6, and 5, respectively. In Figure 3, a spoke 64a that is on the side of the wheel facing the observer and on the side of the wheel which the device 10 is mounted, engages both the flaps 16 and bends them upwardly to the position indicated in Figures 4 and 6 whereupon they slip by the spoke 64a and the longer one 16 slaps against the spoke 64b of the other side of the wheel that is following while the other flap merely moves back to its original position, as indicated in Figure 5. As this next succeeding spoke 64b rotates further, the longer flap 16 is bent upwardly and slips by the spoke 64b into contact with the next succeeding spoke 64c, which also contacts the shorter flap 16. The operation then repeats itself.

Figure 4 illustrates the bending action of the spokes on the longer flap 16 wherein the flap is bent from the full line position to approximately the dotted line position before slipping by the spoke that engages it and slapping against the next succeeding spoke.

Figure 7 illustrates a modification of the invention wherein the device 10a, which otherwise is similar to the device 10, is formed with notches 70 and 72 on each side thereof that receive the ends of a rubber band 74 in which the lengths 76 and 78 thereof are stretched across the outer surface of the device 10a and the lengths 80 and 82 bear against the undersurface of the fender brace 50. Alternately, a length of string, cord or wire could be tied about the device 10 in a manner similar to the way the rubber band 74 is applied thereto.

In the embodiment 106 of Figure 8, indicia in the form of advertising matter is applied to the surface of sounding board 12b. As the ink forming the indicia frequently may be toxic in nature, a relatively thin transparent lamination 80 covers the advertisement indicia. The lamination may be applied in any conventional manner, and is formed from the same substance that device 10 is formed from.

This embodiment of the invention is particularly adapted for use as a premium item for insertion in dry cereal boxes, a common practice of makers of this form of food product.

In some velocipede models the fender brace has a round cross-sectional configuration. In applying my device to velocipedes of this type, a third strip of adhesive tape or the like may be attached to one corner of the sounding board portion 12 and the velocipede fender 53, somewhat as indicated in dotted lines at 90 in Figure 3. Alternately, a strip of adhesive tape or the like can be attached to the fork 54 and one corner of the sounding board portion 12, as indicated in dotted lines at 92 in Figure 6. Thus, the sounding board portion 12 may be employed to stop pivotal or rotational movement of the device when applied to velocipedes of this type. In any case, only one corner of the illustrated sounding board should be attached to a support, as the other corner must be free to vibrate.

It will be noted that the relatively large surface of sounding board portion 12 provides considerable area for application of advertising indicia or the like.

My invention has several distinct advantages over conventional noise makers. For instance, it is a one-piece device formed from an inexpensively manufactured substance. It contains no moving parts and is readily attached to the bicycle or tricycle frame by common and readily available substances and devices, such as the adhesive tape 60 or the rubber band 74. The relatively long taper of the flap 16, tapered in accordance with the rate above specified, spreads the bending of the flaps over the entire flap width. Also, the tendency of the flaps to twist about their longitudinal axes as they are engaged by the spokes is minimized, as indicated in Figure 6, wherein it is shown that the flaps as bent are still substantially parallel to the fender brace to which they are attached. The curves 24 and 26 eliminate the forming of sharp angles at the bases of the flaps which insures that the device 10 will not crack or tear at these critical spots. The taper specified also insures that the flaps have sufficient body so that they will not bend over and break when they are engaged by the individual spokes 54. One reason for this is that the relatively narrow tips eliminate excess weight at the end that would cause the flap to bend or fold about the spoke when hit by a spoke. The taper specified is also designed to provide an optimum flap shape having sufficient resiliency while at the same time avoiding undue air resistance.

While in the illustrated embodiment of the invention I have illustrated a pair of flaps, I contemplate that only one flap may be employed where this is desirable. The device 10 may be attached to the wheel fork 54 as well as to the fender brace, or to any other element of the bicycle or tricycle frame that overlies the wheel thereof. Of course, the invention may be attached to the rear wheel or wheels of a velocipede as well as the front wheel or wheels thereof.

The foregoing description and the drawings are given merely to explain and illustrate my invention, and the invention is not to be limited thereto, except in so far as the appended claims are so limited, as those skilled in the art who have my disclosure before them will be able to make modifications and variations therein without departing from the scope of the invention.

I claim:

1. A velocipede noisemaking device for attachment to a generally vertical planar surface of a velocipede frame fender brace, said device comprising a one piece strip of polystyrene including a generally quadrilateral planar sounding board portion at one end thereof and a planar flap portion at the other end thereof, and means for securing said strip to said fender brace along the juncture of said flap portion with said sounding board portion, with said sounding board and flap portions projecting away from said fender brace and said sounding board portion substantially vertically disposed, said flap portion comprising a flap member tapering from a maximum dimension at its juncture with the sounding board portion to a minimum dimension adjacent its tip at a rate on the order of 0.3 inch per inch of length, said strip being bent along the juncture of said sounding board and flap portions to direct said flap member into the path of movement of the spokes of the velocipede wheel adjacent said fender brace, said flap portion further comprising a second tapered flap member, one side of which is of rectilinear configuration and the other side of which merges into the adjacent side of the first mentioned flap member in a rounded corner, one of said flap members being of sufficient length to be engaged by the spokes of both sides of the wheel and the other flap member being of a length that will permit it to be engaged only by the spokes on the side of the wheel adjacent it.

2. The device set forth in claim 1 wherein said means comprises strips of adhesive tape extending between said strip and said surface of the fender brace.

3. The device set forth in claim 1 wherein said means comprises a rubber band looped about said juncture of said strip and said brace.

References Cited in the file of this patent

UNITED STATES PATENTS

| 826,893 | Seiss | July 24, 1906 |
| 1,604,926 | MacDonald | Oct. 26, 1926 |
| 2,367,430 | Redlund | Jan. 16, 1945 |
| 2,624,156 | Meyer | Jan. 6, 1953 |
| 2,736,136 | Modlin | Feb. 28, 1956 |
| 2,768,474 | Harvey | Oct. 30, 1956 |